June 25, 1963     A. K. BREWER     3,094,981

SELF-HEATING COMPOSITE CONTAINER

Filed Jan. 2, 1962

ALICE K. BREWER
INVENTOR.

BY *Mason & Graham*

ATTORNEYS

United States Patent Office 3,094,981
Patented June 25, 1963

3,094,981
SELF-HEATING COMPOSITE CONTAINER
Alice K. Brewer, 5173 Hollywood Blvd.,
Los Angeles 27, Calif.
Filed Jan. 2, 1962, Ser. No. 163,500
1 Claim. (Cl. 126—263)

This invention relates generally to self-heating containers having a compartment or space for an edible product and another compartment or space for a heating agent.

An object of the invention is to provide a novel construction in a self-heating food composite container or package and a novel way of packaging food with a heating agent to enable the consumer to heat the food, even though it be frozen, without using an external source of heat.

A further object is to provide a novel container or package designed for the sale and distribution of frozen food, dehydrated food, or other product, which is so constructed that the food is completely isolated from the heating agent. In this connection it is an object to provide a multiple packaging container in which one section serves to house the heating agent and another separate and separable container section serves to contain the consumer product.

Another object is to provide a novel self-heating food container of simple construction which lends itself to modern manufacturing and packing methods.

These and other objects will be apparent from the drawing and the following description. Referring to the drawing.

Figure 1:
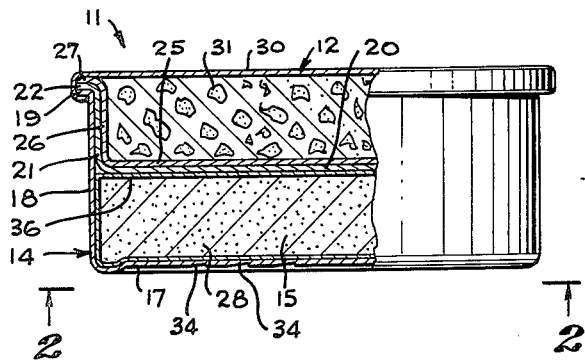
FIG. 1 is a sectional elevational view of a composite container embodying the invention.
Figure 2:
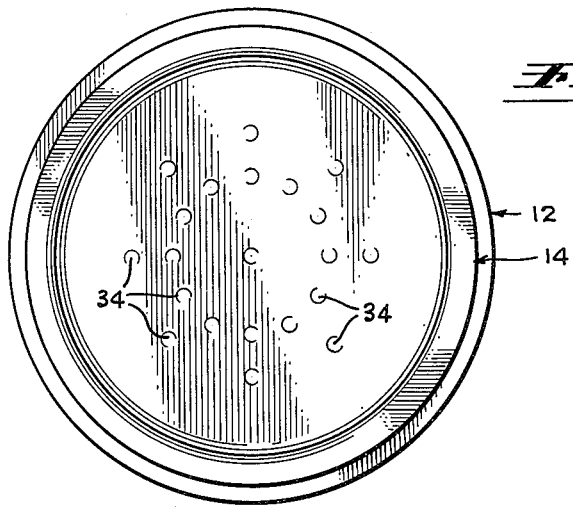
FIG. 2 is a bottom plan view of the container of FIG. 1.

More particularly describing the invention, numeral 11 designates the package or container as a whole which is in the nature of a composite container or package. Numeral 12 generally designates a product container and, as will later become apparent this is separable from the remainder of the package. Originally the upper container or food container is joined to a lower or heating agent container, designated generally by 14. The latter includes an enclosed space or compartment 15 which is designed to hold a suitable supply of chemicals of a type known in the art which reacts exothermically with water to heat the product, such as food, in the container 12.

The lower container 14 of the package includes a bottom wall 17 and a relatively high side wall 18 which terminates at its upper end in a peripheral flange 19. I provide a cover or closure which fits inside the side wall 18 and in turn includes a bottom wall portion 20, a side wall portion 21 and a marginal flange 22. The two walls 18 and 21 are bonded together or hermetically heat-sealed by any suitable means and method to make a fluid tight joint therebetween in the region of the flanges 18 and 19 and therebelow also if desired. The lower container thus becomes leakproof and the chemical is hermetically sealed therein.

The upper section or container 12 includes a dished or open-topped member having a bottom wall 25, side wall 26 and a marginal flange 27. The upper container fits within the open-topped receptacle provided by the upper portion of the lower container 14 but is completely isolated from the chemicals 28 by the wall 20. The upper container is retained within the lower container by a cover or top 30 which extends downwardly around the flanges 19, 22 and 27 and is attached thereto by a cement, adhesive or bonding agent in a manner such as to be capable of being separated manually at least from the flanges 19 and 22 and yet provide a seal with the flange 27 to protect the contents 31 from the atmosphere. The latter seal should be one which results from hermetically heat-sealing or the like.

Figure 3:
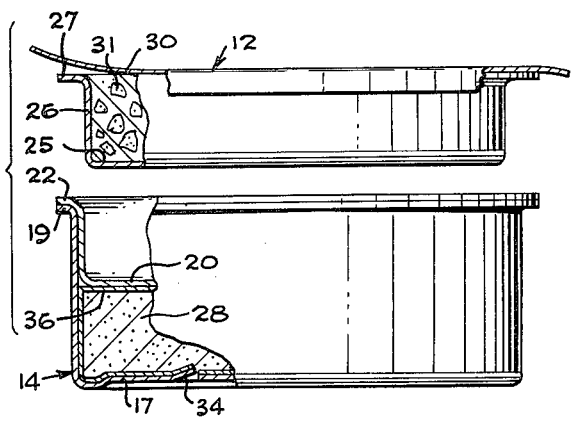
FIG. 3 is a side elevational view, partially in section, showing the food container portion removed from the remainder of the composite container and the cover of the food container partially removed.

The bottom wall of the lower container is preferably dished to provide a raised central section 33 as shown which is scored at a plurality of places 34 to enable the consumer to readily punch holes therein. Thus, in the use of the device, the entire unit is inverted and, after holes are punched in the wall 17 (now uppermost) through the scored areas 34, a given amount of water is poured into the dished area to pass through the holes into the interior. This unites with the chemicals in the chamber or space 15 and the chemical reaction then takes place to heat the contents of the food container. After the food is sufficiently hot, the composite container is again inverted to its original or normal upright position and the container 12 can then be separated from the remainder of the package by loosening the edge of the cover 30, as shown in FIG. 3, and the chemical-holding lower portion 14 discarded. The cover or top subsequently can be stripped off or cut open to expose the contents. If the seal between the cover 30 and flange 27 prevents this, the cover can readily be cut with a knife. The upper or food container, when separated from the lower, becomes a separate casserole or dish with a clean lower surface, and thus can be placed anywhere. This represents a significant improvement over prior self-heating containers where the chemical containing portion is not separable.

The upper and lower containers are preferably fabricated from a thin gauge aluminum sheet stock of the type commonly used in recent years in packaging frozen food although other or thicker or stronger materials can be used. In the lower container I have shown a lining 36 in the space 15. This may be corrugated or regular paper or cardboard across the bottom wall 17 and the side wall 18, but preferably could be an aluminum sheet in area below wall 20. Thus the chemicals are twice enclosed and the bottom and sides of the lower container to some extent insulated from the heat developed.

Although I have shown and described a preferred form of my invention, I contemplate that various changes and modifications can be made without departing from the invention, the scope of which is indicated by the claims which follow. In this connection while I have referred to the composite container as comprising an upper container and a lower container, in effect the closure or cover for the lower container is in itself a container, so that it might be said that the composite is made of three containers.

I claim:

A sanitary, self-heating food container comprising a first container formed of thin-gauge sheet metal and including a bottom wall and a continuous, relatively high, upright side wall terminating at its upper edge portion in an outturned peripheral flange; a dished closure member of thin-gauge sheet metal for said first container including a bottom wall spaced vertically above the bottom wall of said first container and also spaced vertically below the upper edge portion of the side wall thereof; said dished closure having a side wall extending upwardly from its bottom wall in sealing fit within the side wall of said first container and also having an outturned peripheral flange resting on and in sealing engagement with the peripheral flange of said first container, said walls and flanges providing a closed hermetically sealed chamber in the bottom portion of said first container adapted to hold and isolate a quantity of an exothermic material therein and an open-top dished receptacle in the upper portion of said first container; a second dish-like container adapted to hold food or the like and also formed of thin-gauge sheet metal received within said open top dished receptacle and shaped to co-fit therewith and rest upon said bottom wall thereof in direct heat transfer relationship; said second dish-like container also having a peripheral flange at its upper edge seated upon the flange of said dished closure member; and a top closure sheet extending over said second dish-like container and hermetically sealed to the flange thereof; said closure sheet extending outwardly beyond said flange to which it is sealed and extending downwardly, around and under the flange of said first container, whereby upon release of said top closure sheet, said second dish-like container may be readily removed from its heat transfer engagement with said open top dished receptacle in the upper portion of said first container in a clean, sanitary and sealed food-containing serving dish.

References Cited in the file of this patent

UNITED STATES PATENTS

| | | |
|---|---|---|
| 2,620,788 | Rivoche et al. | Dec. 9, 1952 |
| 2,623,515 | Sukacev | Dec. 30, 1952 |

FOREIGN PATENTS

| | | |
|---|---|---|
| 826,637 | France | Jan. 8, 1938 |
| 115,461 | Sweden | Dec. 4, 1945 |
| 117,410 | Sweden | Oct. 15, 1946 |
| 570,854 | Italy | Dec. 18, 1957 |